(12) United States Patent
Dabich, II et al.

(10) Patent No.: US 8,640,591 B2
(45) Date of Patent: Feb. 4, 2014

(54) TRANSPARENT ARMOR WITH IMPROVED MULTI-HIT PERFORMANCE BY USE OF A THIN COVER GLASS

(75) Inventors: Leonard Charles Dabich, II, Painted Post, NY (US); Huan-Hung Sheng, Horseheads, NY (US); Steven Alvin Tietje, Lindley, NY (US); Jian-Zhi Jay Zhang, Ithaca, NY (US); Parimal J. Patel, Joppa, MD (US)

(73) Assignees: Corning Incorporated, Corning, NY (US); The United States of America as Represented by the Secretary of the Army, Washington, DC (US)

( * ) Notice: Subject to any disclaimer, the term of this patent is extended or adjusted under 35 U.S.C. 154(b) by 136 days.

(21) Appl. No.: 13/169,489

(22) Filed: Jun. 27, 2011

(65) Prior Publication Data

US 2012/0174761 A1 Jul. 12, 2012

Related U.S. Application Data

(60) Provisional application No. 61/360,232, filed on Jun. 30, 2010.

(51) Int. Cl.
*F41H 5/02* (2006.01)
(52) U.S. Cl.
USPC .................................. 89/36.02; 89/904
(58) Field of Classification Search
USPC .............................. 89/36.01–36.17, 901–939
See application file for complete search history.

(56) References Cited

U.S. PATENT DOCUMENTS

| 4,663,228 | A | 5/1987 | Bolten et al. |
| 7,704,342 | B2 | 4/2010 | Bourcier et al. |
| 2009/0324935 | A1 | 12/2009 | Bennison et al. |
| 2010/0154622 | A1 | 6/2010 | Zachau et al. |
| 2010/0288117 | A1* | 11/2010 | Jones et al. ................. 89/36.02 |
| 2011/0088541 | A1* | 4/2011 | Pinckney et al. ........... 89/36.02 |
| 2012/0152099 | A1* | 6/2012 | Wilenski et al. ............ 89/36.02 |
| 2012/0174754 | A1* | 7/2012 | Salisbury et al. ........... 89/36.02 |
| 2012/0174755 | A1* | 7/2012 | Cook .......................... 89/36.02 |

FOREIGN PATENT DOCUMENTS

| DE | 2903115 | 3/1980 |
| DE | 2901951 | 7/1980 |
| DE | 9218849 | 11/1995 |
| EP | 0003432 | 8/1979 |

(Continued)

OTHER PUBLICATIONS

Bless et al "Failure Waves in Glass", J. Am. Ceram. Soc., 75 (4) 1002-1004 (1992).

(Continued)

*Primary Examiner* — Samir Abdosh
(74) *Attorney, Agent, or Firm* — Walter M Douglas

(57) ABSTRACT

The disclosure is directed to a transparent armor laminate having a glass, glass-ceramic or ceramic strike face layer, one or a plurality of glass, glass-ceramic ("GC"), ceramic ("C") or polymeric ("P") backing layer behind the strike face layer, one or a plurality of spall catcher ("SC") layers behind the backing layer(s), and a thin cover glass layer laminated to the strike face, the thin layer being the first layer to be impacted by any incoming projectile or debris. The cover glass has a thickness ≤3 mm. In another embodiment the cover glass thickness is ≤1 mm. Additionally, a defrosting/defogging element is laminated between the cover glass and the strike face.

11 Claims, 4 Drawing Sheets

(56) References Cited

FOREIGN PATENT DOCUMENTS

| | | |
|---|---|---|
| EP | 0137613 | 4/1985 |
| WO | 03/068501 | 8/2003 |
| WO | 2009/042877 | 4/2009 |
| WO | 2009/150380 | 12/2009 |

OTHER PUBLICATIONS

PCT/US11/042269 Search Report.

\* cited by examiner

1　　#2　　#3

1　　#2　　#3

1　　#2　　#3

1　　#2　　#3

8A

8B 25.4mm x 25.4mm grids

TRANSPARENT ARMOR WITH IMPROVED MULTI-HIT PERFORMANCE BY USE OF A THIN COVER GLASS

PRIORITY

This application claims the benefit of priority under 35 U.S.C. §119 of U.S. Provisional Application Ser. No. 61/360,232 filed on Jun. 30, 2010, the content of which is relied upon and incorporated herein by reference in its entirety.

GOVERNMENT RIGHTS

The subject matter of this disclosure was made with United States Government support under Agreement No. HR0011-10-C-0005 awarded by DARPA. The United States Government has certain rights in the subject matter of this disclosure.

FIELD

The disclosure is directed to transparent armor having improved multi-hit performance by the use of a thin cover glass. The transparent armor includes a glass or glass-ceramic strike face layer, one or a plurality of glass, glass-ceramic or polymeric backing layers, and a spall catcher layer, and further includes a thin cover glass layer ahead of the strike face layer.

BACKGROUND

The "multi-hit" requirements for transparent armor ("TA") are driven by need in the conflicts. In today's military missions the encounter with the adversary is at closer distances than in most prior, "conventional" warfare situations, and there is a greater occurrence of sniper situations. Consequently, in consideration of the present situations, the multi-hit specifications for TA typically require the distance between the shots received by the TA be much smaller than the 100-120 mm distance used in older specifications. One specification that is currently in wide use calls a "T-pattern" in which a shot spacing of 50 mm is required along the two axes of the "T." To be within the allowable tolerances of the specification, the shot spacing can be as small 20 mm during testing and still qualify as "valid." For a glass-based TA, meeting the new T-pattern specifications is an industry-wide challenge.

In addition to multi-hit requirements, it is required that new TA systems or laminates be of lower weight that the prior systems or laminates. As a result, new materials are starting to play a role in managing TA weight. These new materials include transparent ceramics of spinel, ALON and sapphire, transparent glass-ceramics, and other high performance glasses such as borosilicate glasses. However, due to cost/performance tradeoffs, these materials are typically used as a strike-face material to effectively break up or deform a hard projectile; and glass and/or polymer layers are placed behind the strike-face to form the remainder of a TA laminate and defeat the projectile.

To meet the tight multi-hit requirement, it is imperative that the strike-face material remain part of the TA's functionality for all shots, rather than for just the first impact. The key to multi-hit capability is to retain the strike-face integrity and, ideally, to also reduce the size of damage during impact, thus enabling effective defeat of multiple impacts. A glass cover sheet or layer over the strike-face is a natural choice. A plastic-based cover is lightweight, and can be effective in retaining material, but it lacks the scratch resistance needed for an outer-most layer. Conventional wisdom appears to have driven manufacturers to use a 6 mm or 10 mm glass layer as a cover to provide the perceived need for scratch and rock-strike resistance. However, the use of such 6 mm or 10 mm cover glasses added weight to the TA laminate and it has also been found to greatly reduce the strike-face performance, rendering the whole multi-layer laminate less effective in performance. A possible explanation is that the weak cover glass can be the initiation point of a fast traveling failure wave which pre-conditions and weakens the strike-face ahead of the projectile. This is undesirable. Consequently, there remains a need for an effective cover that improves multi-hit performance without compromising scratch and rock-strike properties.

SUMMARY

In one aspect the disclosure is directed to a transparent armor laminate having a glass, glass-ceramic or ceramic strike face layer, at least one glass, glass-ceramic ("GC"), ceramic ("C") or polymeric ("P") backing layer(s) the strike face layer, at least one spall catcher ("SC") layer(s) behind the backing layer(s), and a thin cover glass layer laminated, using adhesive materials as described herein, to the strike face, the thin layer being the first layer to be impacted by any incoming projectile or debris. In one embodiment the cover glass has a thickness ≤3 mm. In another embodiment the cover glass thickness is ≤1 mm. In a further embodiment a defrosting/defogging element is laminated between the cover glass and the strike face. In an additional embodiment the TA laminate having a cover glass has an IR absorbing adhesive layer behind the thin cover glass, and ahead of the strike face layer, to absorb most of the solar heat and dissipate the heat through the thin glass layer. In an embodiment the TA laminate having a cover glass has both an IR absorbing adhesive layer and a defrosting/defogging element between the cover glass and the strike face

Glass (Corning Incorporated, Corning, N.Y.) cover glass after shots #1, #2 and #3, the laminate retaining GC near shot #4 location as indicated by the white arrow.

Figures 8A, 8B:
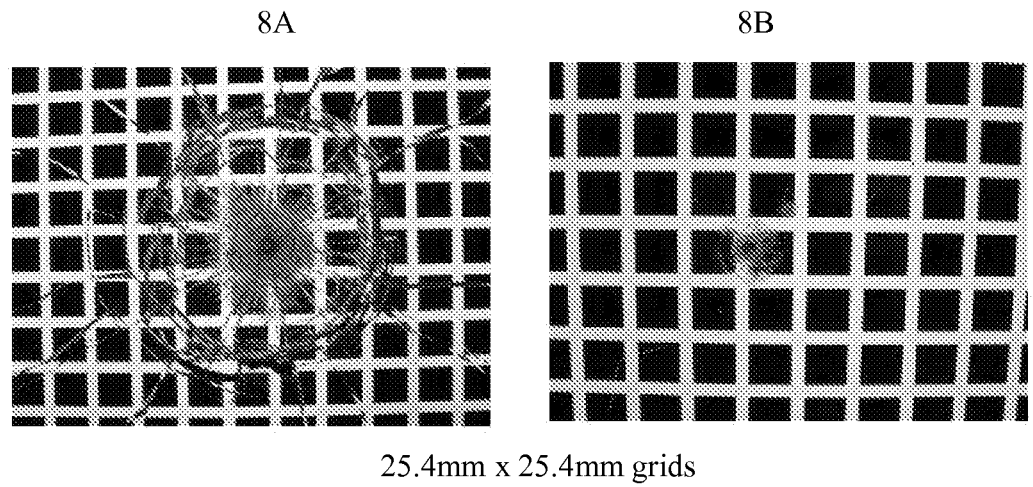

FIGS. 8A and 8B are photographs illustrating the performance of a 6 mm Borofloat® glass (8A, Schott Glass, Elmsford, N.Y.) and 0.7 mm Eagle® glass (8B) in a simulated rock strike using a ¾" diameter steel ball having a velocity in the range of 60-7060 mph.

Figure 9:
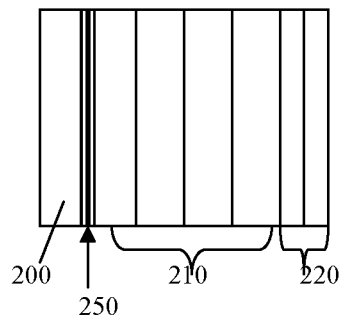

FIG. 9 is a schematic in which a heating element is located behind an 8-10 mm glass strike face as of conventional TA laminates.

Figure 10:
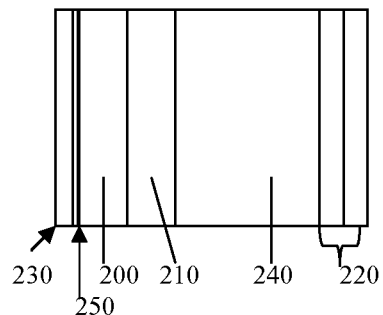

FIG. 10 is a schematic in which a heating is located behind a 0.7 mm Eagle® glass cover in accordance with the present disclosure.

Figure 11:
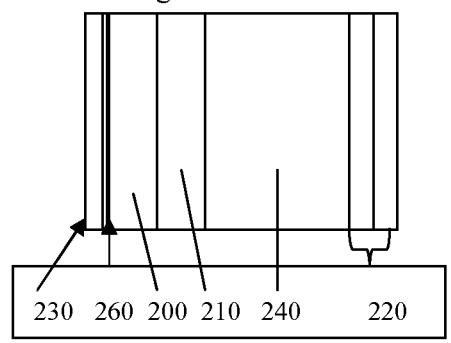

FIG. 11 is a schematic in which an IR absorbing adhesive layer is located behind a 0.7 mm Eagle® glass cover in accordance with the present disclosure.

DETAILED DESCRIPTION

Herein the terms "projectile" and "shot" may be used interchangeable and should be understood to include, in addition to a bullet shell fired from weapon, debris that may be caused to strike the TA laminate as a result of an explosion, high winds such as may be present in a hurricane or tornado, or from other causes. Bonding the laminate layers to one another, including the bonding of the cover glass with or without conductive layer, and the wire mesh used as a heating element, is carried out using bonding materials in fluid, gel, paste or film form. Typically the bonding materials are polymeric adhesives in fluid, gel, paste or film form.

Also herein, transparent armor ("TA") means any transparent armor laminate that comprises a strike face layer, one or a plurality of backing layers and one or a plurality of spall catcher layers, the layers being laminated or bonded to one another by use of an adhesive layer, for example, an fluid adhesive applied to at least one of the surface being bonded together or an adhesive polymeric interlayer sheet placed between the surfaces that are to be bonded together. Although this disclosure describes the placement of a transparent thin "cover glass," "glass cover" or "cover" layer as the first layer that will receive an incoming projectile of any type (bullet or shell, shrapnel, rock, etc.), the term "strike face" is used herein to for the first transparent glass, glass-ceramic or polymeric layer (not including bonding interlayer) behind the glass cover. The glass cover can be selected from, but not limited to, the group of aluminosilicate glass, alkali aluminosilicate glass, borosilicate, alkali aluminoborosilicate glass, and soda lime glass. The glasses that contain alkali metal ion can be chemically strengthened by ion-exchange of the alkali metal ions in the glass with large metal ions, preferably larger alkali metal ions.

The present disclosure disclosed the novel concept and experimental results demonstrating the use of a thin-glass-cover to improve the multi-hit performance of transparent armor. A thin cover glass, less than or equal to 3 mm thick, is placed in front of a multi-layer TA stack as the first layer facing the incoming threat (projectile or debris). The TA stack may contain high performance strike-face materials such as a transparent glass-ceramic, a transparent ceramic or other glass and ceramic types. The thin glass cover effectively causes retention of the strike face material during the ballistic event, thereby enabling more effective defeat of a subsequent impact near the first impact area. In one embodiment the cover thickness is less than or equal to 1 mm thick. The cover glass can be a fusion drawn glass, slot drawn glass or float glass. For example without limitation, the cover glass can be LCD display glass, for example without limitation, Eagle® XG glass (Corning Incorporated), the glass being in 0.5 mm-1 mm thickness range. For improved low-speed impact resistance such as that against rock or other debris strikes, as well as additional protection for the strike face, a chemically strengthened glass, for example without limitation, Corning Gorilla® glass in 0.5 mm-2 mm thickness can be used.

The use of a cover glass as disclosed herein presents a number of advantages for transparent armor used. These advantages include:

1. Greatly reduced "pre-conditioning" of the strike-face material from failure waves generated in the cover layer, as is the case with using thick glass cover.

2. Effective retention of strike-face material during impact.

3. Negligible weight increase from the use of the less than or equal to 5 mm cover glass.

4. Enables the use of un-polished strike-face sheet, e.g., the use of an as-rolled glass-ceramic, thereby decreasing costs.

5. Superior rock-strike performance.

6. The potential to absorb and dissipate solar heat in the thin outer cover glass layer for improved hot temperature performance, which is advantageous in desert conditions.

7. Increased, defogging de-icing and defrosting efficiency through the placement of a heating element between the cover glass and strike face layers.

In the examples and samples described herein a glass-ceramic was used as the strike-face material. Other strike-face materials such as transparent ceramics or high performance glass materials could also be used with similar results. The TA laminates used in the examples and samples, with or without the cover layer (glass or polymeric), comprised the GC strike face, one or a plurality of intermediate or backing layers, and a spall catcher layer. The layers were bonded together using a polymeric adhesive that can be a polymeric adhesive sheet or a polymeric adhesive fluid.

The Role of a Strike-Face and Typical Configurations

A strong strike face material typically possesses superior mechanical properties such as hardness and toughness. For example, Corning's 9665 glass-ceramic (GC) has a hardness ~50% higher than float glass. High hardness helps break up or deform the projectile making penetration less likely. For this reason, the hard material should be placed at the front of the TA stack where it will serve as the strike face. A typical configuration that results in V50 of 2950 fps is as follows:

10 mm GC/15.9 mm Borofloat/6.4 mm Borofloat/12.7 mm PC

This stack has an areal density (AD) of 18.8 lb/sft, and in making the laminate the "tin" side of the Borofloat layers, the side of the glass that was in contact with the molten tin in the float process, faced the incoming threat. The GC and glass layers were laminated using a commercial adhesive, for example, 15 mil polyurethane ("PU") adhesive such as Deerfield 4700 or Huntsman 399. As illustrated in the following experiment, the GC layer needs to be in the front of the stack. If the 15.9 mm Borofloat layer was placed in the front of the stack to serve as the strike face and the GC layer was placed behind it inside the stack, the resulting stack-up (laminate) produces a V50 of ~2650 fps, which is a 300 fps decrease as compared to when the GC layer is the strike face layer.

Cover Glass Effect on V50 and Multi-Hit

The exact mechanism for greatly reduced GC performance when the GC layer is embedded or buried in the stack is not known at this time. One possible explanation is based on a "failure wave" as discussed by Stephan Bless et al, "*Failure Waves in Glass,*" Journal of the American Ceramic Society, Volume 75 Issue 4, pages 1002-1004. Bless et al observed that the impact event on the strike surface of a glass material creates a "failure wave" which travels faster than and ahead of the impacting projectile at the typical projectile velocities of interest in transparent armor applications. Behind the failure wave there is a total loss of tensile strength and a substantial drop in shear strength. In effect the failure wave will fracture the material in the path of the projectile; and consequently the projectile will engage a weakened material. If glass-ceramic is the material the projectile engages first, the interaction will be between the projectile and the "undamaged" glass-ceramic; a weaker cover glass gives the "failure wave" time to pre-condition and thus weaken the glass-ceramic. Assuming that this is correct, and then the thickness of the cover glass may play an important role. A thick cover may create a more damaging "failure wave" and allow more time for it to weaken the glass-ceramic that it fronts and visa versa.

To quantify the influence of a thin glass cover on V50, a 0.7 mm Eagle® glass cover was placed forward (in the direction of the incoming projectile) of the GC in the typical configuration discussed above. A 15 mil PU adhesive was used to attach the Eagle to the GC. While the cover glass and the additional PU adhesive added some weight to the target, ~0.5 lb/sft ("sft" means "square foot"), V50 was seen to drop by ~70 fps ("fps" means "feet per second"). This is not an insignificant decrease and the benefit to multi-hit must out-weigh this loss of V50 to justify its use. In contrast, when a 6 mm thick soda lime cover glass was used, areal density increased by 3.1 lb/sft, and V50 was also observed to drop by ~70 fps. Thus, while the TA systems having a 0.7 mm Eagle® Glass or 6.0 mm Borofloat® glass cover both achieved multi-hit capability, the latter approach (Borofloat) does it with a significantly less weight efficiency (that is at much larger increase in areal density).

Figure 2:
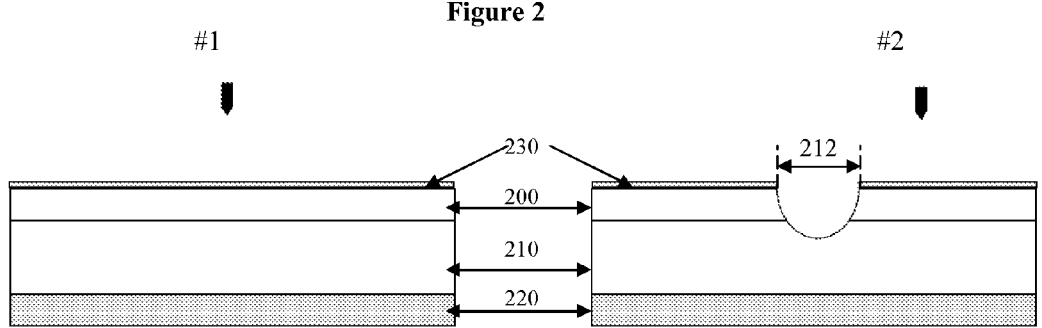
FIG. 2 is a drawing of a TA laminate with a thin cover glass illustrating how, after the impact of projectile or shot #1, strike face loss is reduces which results in improving the defeat of projectile #2.
Figure 4:
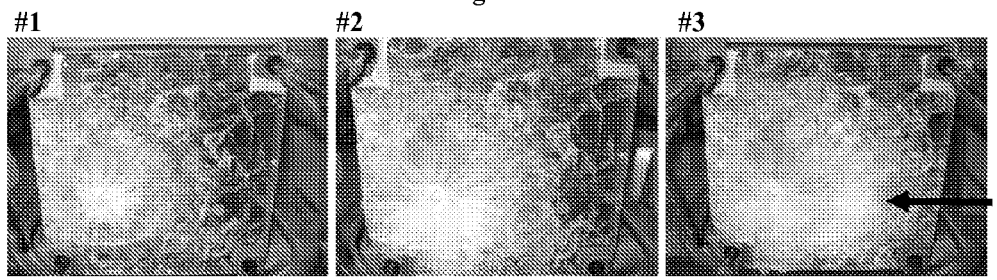
FIG. 4 is a photograph showing the front of a 14"×14" TA laminate with a GC strike face, without a cover glass, having a glass-ceramic strike after shots #1, #2 and #3, the sample having a significant loss of GC near shot #4 location as indicated by the white arrow.

A discussion of the thin glass cover effect on multi-hit, in particular, when used with the "T-pattern" test procedure, is required to fully understand this disclosure. The "T-pattern" procedure is illustrated in FIG. 2 where #1, #2, #3 and #4 represent shots 1-4 fired in order against the target; the circles, as exemplified by the circle represented by numeral 150, are the target circles for shots 1-4; numeral 152 indicates the width edge and numeral 156 indicates the length edge, the length being the larger of the two major part dimensions and the width being the smaller of the two major part dimensions; numeral 154 indicates the length center line; numeral 158 indicates the width center line. Shots #1 and #2 are directed to the circles that lie above and below width center line 158. The distance between the centers for shots #1 and #2 is 50 mm, and the distance between the centers for shots #1 and #2 and the width center line is 25 mm as indicated. In FIG. 4, shots #3 and #4 are to the right of shots #1 and #2; and the center of the shot circles for shots #3 and #4 lie on the width center line and are separated by 50 mm. As illustrated, the horizontal distance between the center of the shot #1 (or #2) circle and the center of the shot #3 circle is 125 mm. Also as illustrated, the horizontal distance between the center of shot #1 (or #2) circle and the center of the shot #4 circle is 175 mm.

The T-pattern test requires that four shots must be stopped by the TA sample without penetration. As indicated above, shot #1 and shot #2 are spaced by 50 mm, as are shots #3 and #4 relative to each other. The typical fracture pattern for a shot extends into a circle with radius 50-100 mm depending on projectile type and velocity. Viewing shots #1 and #2 as one set of the T-pattern and shots #3 and #4 as the second set of the pattern, the most severe problems lie with shot #2, and especially with shot #4. Each of these shots strikes an area that is already weakened by a closely adjacent shot. The purpose of the cover glass is to confine strike-face damage and retain glass-ceramic material so that shots #2 and #4 reliably engage the glass-ceramic, even if it is partially fractured material.

Figure 1:
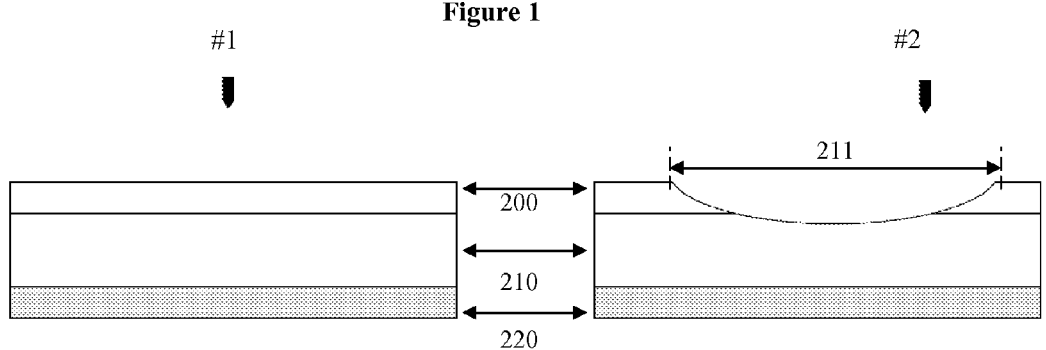
FIG. 1 is an drawing of a TA laminate without a cover glass illustrating how strike face loss during impact of the first projectile or shot (#1) leads to projectile or shot #2 "seeing" no strike face.
Figure 3:
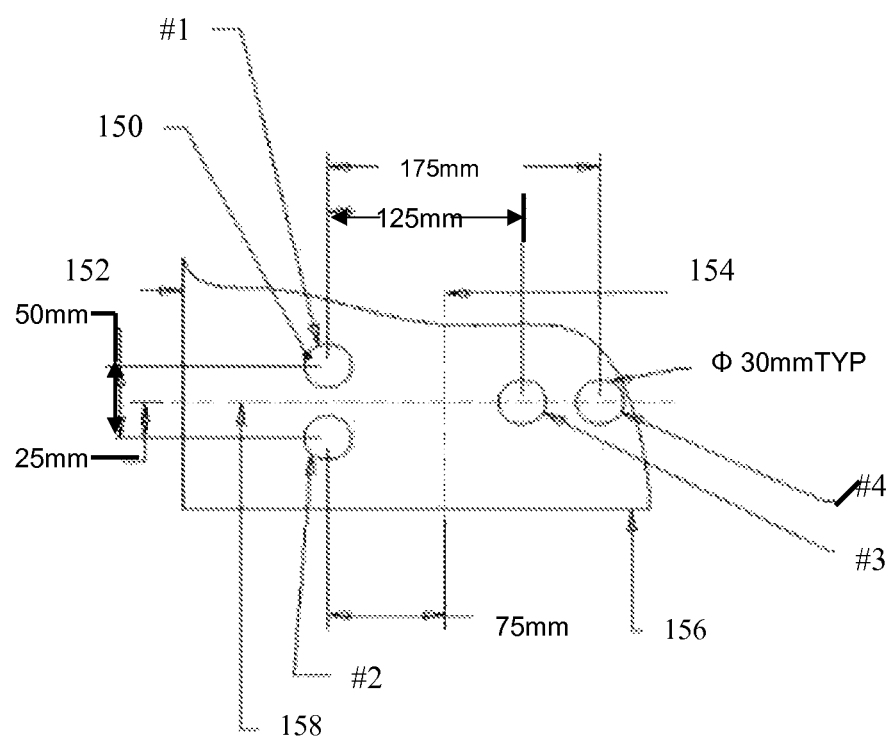
FIG. 3 is a schematic illustrating the T-pattern formed by four shots and the further illustrating the maximum distances between the shots as required by the T-pattern specification.

FIGS. 1 and 2 illustrate the importance of retaining strike face material when conducting the T-pattern test. FIG. 1 illustrates a TA laminate having a strike face 200, one or a plurality of backing layers 210 and a spall catcher layer 220. When projectile #1 impacts strike face 200, material can be ejected and a "crater" or severely damaged area 211 can be formed such as is such as illustrated on the right of FIG. 1. When projectile #2 impacts within the "crater" it can strike a lesser amount of strike face material 200 or the backing material 210 with the result that the TA will be severely further weakened. When additional projectiles #3 and #4 impact a distance away as illustrated in FIG. 3, the result can be either failure of the TA system or such severe damage that vision through the TA is severely impaired or not possible. In contrast to FIG. 1, when a thin cover glass 230 is placed before the strike face layer 200 as illustrated, the impact of projectile #1 creates a much smaller "crater or damaged area 212 such as is illustrated on the right of FIG. 2. When projectile #2 impacts, it will first strike the cover layer and then strike a retained strike face material resulting in much less damage than is the case in FIG. 1. When additional projectiles #3 and #4 impact a distance away as illustrated in FIG. 3, the TA system will withstand the damage without penetration and at least some visual ability remaining. Without being held to any particular theory, it is believed that the use of a thin cover glass having a thickness ≤3 mm, when bonded to the strike face use a adhesive material, presents a surface that possesses some flexibility so that when the projectile strikes the cover glass does some bending that helps dissipate the projectile's energy and thus decreases the intensity of the "failure wave" and lessens it over impact on the TA laminate.

FIGS. 4-7 are a comparison of TA laminates without a cover glass (1 example) and with cover glass (3 examples). The comparison is for samples after, from left to right, receiving shots #1, #2 and #3. Shot #4 is to be targeted for the location indicated by the tip of the arrow on the right side. The laminates are:

FIG. 4: TA with GC strike face and no cover glass.

Figure 5:
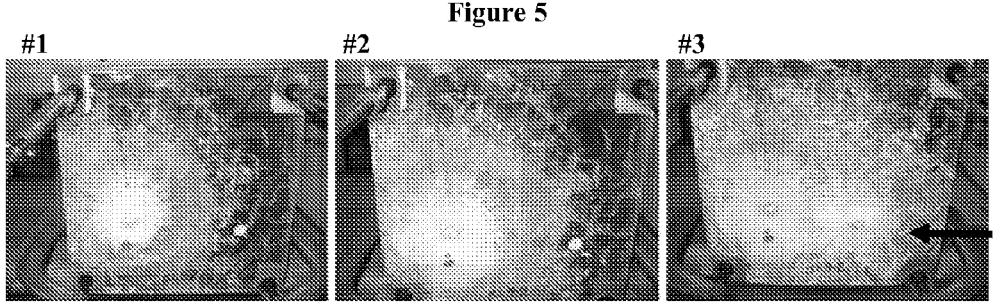
FIG. 5 is a photograph showing the front of 12".14: TA laminate with a GC strike face, with a 1/16" (1.6 mm) polycarbonate ("PC") cover sheet after shots #1, #2 and #3, the laminate retaining GC near the shot #4 location as indicated by the white arrow

FIG. 5: TA with GC strike face and a 1/16" (~1.6 mm) (polycarbonate) cover glass.

Figure 6:
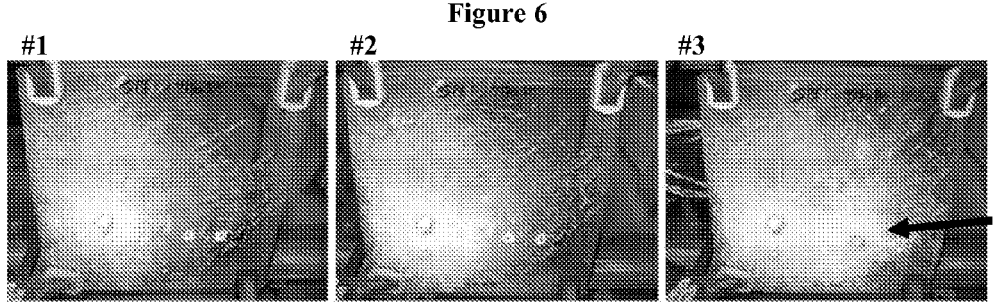
FIG. 6 is a photograph showing the front of a 14"×14" laminate with a GC strike fact and with a 6 mm glass cover glass after shots #1, #2 and #3, the laminate retaining GC near the shot #4 location as indicated by the white arrow.

FIG. 6: TA with GC strike face and a 6 mm soda lime cover glass.

Figure 7:
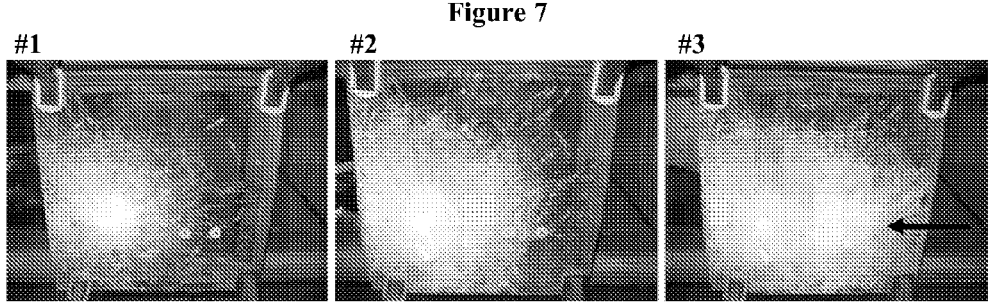
FIG. 7 is a photograph showing the front of a 14"×14" laminate with a GC strike fact and with a 0.7 mm Eagle®

FIG. 7: TA with GC strike face and a 0.7 mm Eagle® Glass cover glass

From the pictures in FIG. 4-7, the benefit of adding a cover to the GC strike-face is quite observable. Without any consideration being given to scratch resistance or weight, a PC (polycarbonate) cover is desirable for its cost advantage preferred. However, adding scratch resistance to the TA requirements (specification) rules out the use of any plastic based cover material due to the fact such materials are readily abraded. Consequently, glass becomes a material of choice. Between the choices of a thin cover glass (<3 mm) and a relatively thick cover glass (>6 mm), a thin cover glass was chosen (in these examples a <1 mm cover glass) from low weight and reduced adverse ballistic impact considerations.

Other Considerations that Favor Thin Glass Cover

There are other ancillary requirements that should be considered when choosing the cover glass thickness; for example:

Rock strike, which is encountered during TA use, must be analyzed and considered before the TA end user will adopt a new strike-face configuration. At a first glance, a ≤3 mm glass layer, and particularly a ≤1 mm thick glass layer, seems as being weak in resisting a low speed, high mass rock strike.

However, this turns out not to be the case. When the performance of a 0.7 mm Eagle® glass cover, FIG. 8B, was compared with a 6 mm Borofloat® glass cover, FIG. 8A, in resisting a ¾" diameter steel ball at traveling at a velocity in the range of ~60-70 mph, while both glasses were cracked by the ball, the Eagle glass cover showed a much smaller damage zone with minimal visual impact. In comparison to the Eagle glass, the 6 mm glass cover showed a more extensive damage zone. The use of a chemically strengthened glass, for example without limitation, commercially available Gorilla® glass (Corning Incorporated) can provide better performance in the steel ball test than Eagle® glass. The higher the compressive stress and depth-of-layer, the better the scratch resistance. Thermal tempering of the thin glass can also improve performance in the steel ball test.

Abrasion resistance, which can reduce ballistic performance and cause visual degradation, is another desirable requirement for TA. Polymers layers and soda lime glass are susceptible to abrasion, for example, by blowing sand. Both thin Eagle® and thin Gorilla® glass outperform soda lime glass, with Gorilla® glass being the best performing glass of the three. Although soda lime can be chemically strengthened, both the depth and degree of ion exchange in soda line are much lower than possible with Gorilla® glass, hence its abrasion resistance performance will be less.

De-icing, defrosting and defogging efficiency can be greatly improved when a heating element, either a transparent conductive coating, or a wire grid, is placed behind the cover glass and heat is conduced through the cover glass to the outer (non-bonded) surface as is illustrated in FIG. 9. A bonding material, for example polyurethane, can be applied to the conductive coating side of a cover glass to bond the cover glass with its conductive coating to the strike face. When a wire mesh is used as the heating element the bonding material can also be used to bond the cover glass, the wire mesh and the strike face to one another. The bonding material can be in a fluid, gel, paste or film form as known in the art. When a bonding film is used the film will soften during the bonding process and the bond the cover glass to the strike face with the thin heating wire-mesh embedded in the bonding film.

In FIG. 9 as illustrated, a heating element 250 is located between the strike face layer 200 and the first of a plurality of glass backing layers 210 which are followed by the polymer spall catching layer 220, for example, PC. Compared to a typical TA first layer thickness of 6-10 mm as represented by FIG. 9, a 0.7 mm cover glass has ~¹⁄₁₀th the thickness, which should help heating efficiency from both thermal mass and heat conduction standpoints. FIG. 10 illustrates an embodiment of the disclosure in which a heating element 250 is located between the thin glass cover 230 and strike face layer 200 which is followed, in this embodiment, by a single glass backing layer 210, an acrylic backing layer or layers (illustrated as a single layer) 240 that has a selected thickness approximately equal to that of the glass backing layers of FIG. 9 that it replaces and a spall catcher layer 220. The use of the thin cover glass 230 to improve multi-hit performance enables the replacement of some of the glass backing layers with an approximate equal thickness of polymer backing layer(s) resulting in a significant weight savings. A "standard" all glass TA, such as illustrated in FIG. 9, with an overall thickness of 62 mm would have an areal density of 28 lb/sft whereas the solution illustrated in FIG. 10 that uses a thin cover glass and partial replacement of the glass backing layers with a polymeric layer(s) will have an areal density of ~21 lbs/sft, 25% reduction in weight.

Solar heating is a known problem for TA that arises due to the adhesive interlayers between the TA laminate layers absorbing the IR in the solar spectrum. Thick glass surrounding the adhesive makes heat dissipation inefficient, leading to excessive heating of the adhesive layers, which in turn weakens the TA performance. When a thin glass cover is placed in front of the strike face layer the adhesive layer behind the thin cover glass can absorb most of the IR radiation and dissipate the resulting heat through the thin glass layer. This strategy could help increase TA performance under severe solar loading such as encountered in desert conditions. In addition to protecting the adhesive bonding the strike face, backing and spall catcher layer from overheating and loosening the bonding between the layers, the adhesive used to bond the thin cover glass to the strike face layer reduces the thermal load that will enter, for example, a vehicle. This in turn will reduce the power requirements for any cooling that must be done; for example, in an ambulance or armored personnel carrier. In FIG. 11 as illustrated, an absorbing adhesive 260 is used between the cover glass 230 and the strike face layer 200, and bonds cover glass layer 230 to strike face layer 200. As illustrated, the strike face layer 200 is followed by a single glass backing layer 210, an acrylic backing layer or layers (illustrated as a single layer) 240 that has a selected thickness approximately equal to that of the glass backing layers of FIG. 9 that it replaces and a spall catcher layer 220. The embodiment illustrated in FIG. 11 has an areal density of 21 lbs/sft like that of FIG. 10, and the weight reduction is also 25% over the 28 lbs/sft of a standard all glass TA system. In an additional embodiment the cover glass 230 has a conductive element for heating, defrosting and defogging on one side of the glass, and the adhesive bonds the conductive side of the cover glass to the strike face. In a further embodiment the heating, defrosting and defogging element is a wire mesh element, and the adhesive bonds the cover glass, the wire mesh element and the strike face together.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A transparent armor laminate comprising a strike face layer, at least one spall catcher layer, and at least one backing layer between the strike face layer and the at least one spall catcher layer, all of said layers being adhesively bonded to one another, and
   a cover glass layer having a thickness in the range of 0.5 mm to 2 mm adhesively bonded to said strike face layer;
   wherein:
   the strike face layer is selected from the group consisting of a glass and glass ceramic,
   the at least one backing layer is a glass layer, and
   the spall catcher layer is a polymeric material; and
   the cover glass is a fusion drawn glass.

2. The transparent armor laminate according to claim 1, wherein said cover glass layer has a thickness of ≤1 mm.

3. The transparent armor laminate according to claim 1, wherein the fusion drawn cover glass is selected from the group consisting of aluminosilicate glass, alkali aluminosilicate glass, borosilicate, alkali aluminoborosilicate glass, and soda lime glass.

4. The transparent armor laminate according to claim 1, wherein the cover glass is a chemically strengthened glass.

5. The transparent armor laminates according to claim 1, wherein said laminate further comprises a heating element between the cover glass layer and the strike face layer.

6. The transparent armor laminate according to claim 5, wherein the heating element is a conductive layer on one side of the cover glass, and the conductive layer side is bonded to the strike face.

7. The transparent armor laminates according to claim 6, wherein the conductive layer side of the cover glass is adhesively bonded to the strike face with an IR absorbing adhesive.

8. The transparent armor laminate according to claim 5, wherein the heating element is a wire grid adhesively bonded to the cover glass and to the strike face.

9. The transparent armor laminates according to claim 8, wherein the wire grid is adhesively bonded with an IR absorbing adhesive.

10. The transparent armor laminates according to claim 1, wherein the cover glass layer is a fusion drawn glass having a thickness in the range of 0.5 mm to 1.5 mm.

11. The transparent armor laminates according to claim 4, wherein the cover glass layer is a chemically strengthened fusion drawn glass having a thickness in the range of 0.5 mm to 1.5 mm.

\* \* \* \* \*